(12) United States Patent
Pauls et al.

(10) Patent No.: US 7,475,728 B2
(45) Date of Patent: Jan. 13, 2009

(54) TREATMENT FLUIDS AND METHODS OF USE IN SUBTERRANEAN FORMATIONS

(75) Inventors: Richard W. Pauls, Duncan, OK (US); Larry S. Eoff, Duncan, OK (US); Trinidad Munoz, Jr., Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 440 days.

(21) Appl. No.: 10/897,509

(22) Filed: Jul. 23, 2004

(65) Prior Publication Data

US 2006/0016596 A1    Jan. 26, 2006

(51) Int. Cl.
*E21B 43/27* (2006.01)
(52) U.S. Cl. .......................... 166/300; 175/72
(58) Field of Classification Search ................. 166/300; 175/72
See application file for complete search history.

(56) References Cited

U.S. PATENT DOCUMENTS

| | | | |
|---|---|---|---|
| 2,238,671 A | 4/1941 | Woodhouse ................. 166/21 |
| 2,703,316 A | 3/1955 | Schneider .................... 528/354 |
| 3,173,484 A | 3/1965 | Huitt et al. ............... 166/280.1 |
| 3,195,635 A | 7/1965 | Fast .......................... 166/280.1 |
| 3,302,719 A | 2/1967 | Fischer .................... 166/280.2 |
| 3,364,995 A | 1/1968 | Atkins et al. ............. 166/280.1 |
| 3,366,178 A | 1/1968 | Malone et al. ........... 166/280.1 |
| 3,455,390 A | 7/1969 | Gallus ........................ 166/295 |
| 3,784,585 A | 1/1974 | Schmitt et al. .............. 260/861 |
| 3,819,525 A | 6/1974 | Hattenbrun |
| 3,828,854 A | 8/1974 | Templeton et al. .......... 166/307 |
| 3,836,465 A * | 9/1974 | Rhudy et al. ................ 507/108 |
| 3,868,998 A | 3/1975 | Lybarger et al. ............ 166/278 |
| 3,912,692 A | 10/1975 | Casey et al. ................. 528/354 |
| 3,948,672 A | 4/1976 | Harnsberger |
| 3,955,993 A | 5/1976 | Curtice |
| 3,960,736 A | 6/1976 | Free et al. ............... 252/8.55 R |
| 3,968,840 A | 7/1976 | Tate ........................ 166/280.1 |
| 3,986,355 A | 10/1976 | Klaeger |
| 3,998,272 A | 12/1976 | Maly .......................... 166/281 |
| 3,998,744 A | 12/1976 | Arnold et al. ............... 507/269 |
| 4,010,071 A | 3/1977 | Colegrove |
| 4,068,718 A | 1/1978 | Cooke, Jr. et al. ........ 166/280.2 |
| 4,169,798 A | 10/1979 | DeMartino ............. 252/8.55 R |
| 4,172,066 A | 10/1979 | Zweigle et al. |
| 4,261,421 A | 4/1981 | Watanabe ................... 166/281 |
| 4,265,673 A | 5/1981 | Pace et al. |
| 4,299,825 A | 11/1981 | Lee |
| 4,387,769 A | 6/1983 | Erbstoesser et al. ......... 166/295 |
| 4,460,052 A | 7/1984 | Gockel ........................ 175/72 |
| 4,470,915 A | 9/1984 | Conway ................ 252/8.55 R |
| 4,498,995 A | 2/1985 | Gockel .................. 252/8.5 LC |
| 4,502,540 A | 3/1985 | Byham |
| 4,506,734 A | 3/1985 | Nolte |
| 4,521,316 A | 6/1985 | Sikorski |
| 4,526,695 A | 7/1985 | Erbstoesser et al. ..... 252/8.55 R |
| 4,632,876 A | 12/1986 | Laird et al. |
| 4,694,905 A | 9/1987 | Armbruster |
| 4,715,967 A | 12/1987 | Bellis |
| 4,716,964 A | 1/1988 | Erbstoesser et al. ......... 166/284 |
| 4,767,706 A | 8/1988 | Levesque |
| 4,772,346 A | 9/1988 | Anderson, Jr. et al. |
| 4,785,884 A | 11/1988 | Armbruster |
| 4,793,416 A | 12/1988 | Mitchell |
| 4,797,262 A | 1/1989 | Dewitz |
| 4,809,783 A | 3/1989 | Hollenbeck et al. ......... 166/307 |
| 4,817,721 A | 4/1989 | Pober ......................... 166/295 |
| 4,822,500 A | 4/1989 | Dobson, Jr. et al. |
| 4,829,100 A | 5/1989 | Murphey et al. |
| 4,836,940 A | 6/1989 | Alexander |
| 4,843,118 A | 6/1989 | Lai et al. ..................... 524/555 |
| 4,848,467 A | 7/1989 | Cantu et al. ................. 166/281 |
| 4,863,980 A | 9/1989 | Cowan et al. |
| 4,886,354 A | 12/1989 | Welch et al. |
| 4,894,231 A | 1/1990 | Moreau et al. |

(Continued)

FOREIGN PATENT DOCUMENTS

EP    0 510 762 B1    10/1992

(Continued)

OTHER PUBLICATIONS

Foreign Search Report (PCT Appl. No. 05254540.7-2315), Dec. 6, 2005.

(Continued)

*Primary Examiner*—David Bagnell
*Assistant Examiner*—Nicole Coy
(74) *Attorney, Agent, or Firm*—Robert A. Kent; Baker Botts LLP

(57) ABSTRACT

The present invention relates to subterranean treatment operations. More particularly, the present invention relates to improved treatment fluids and methods of using such improved treatment fluids in subterranean formations. An example of a method of the present invention is a method of treating a subterranean formation. Another example of a method of the present invention is a method of drilling in a subterranean formation. Another example of a method of the present invention is a method of degrading a filter cake in a subterranean formation. An example of a composition of the present invention is a treatment fluid comprising a degradable diverting agent. Another example of a composition of the present invention is a degradable diverting agent for use in a subterranean treatment fluid.

34 Claims, No Drawings

U.S. PATENT DOCUMENTS

| | | | |
|---|---|---|---|
| 4,957,165 A | 9/1990 | Cantu et al. | |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | |
| 5,034,139 A | 7/1991 | Reid et al. | |
| 5,082,056 A | 1/1992 | Tackett, Jr. | 166/295 |
| 5,142,023 A | 8/1992 | Gruber et al. | 528/354 |
| 5,152,781 A | 10/1992 | Tang et al. | |
| 5,161,615 A | 11/1992 | Hutchins et al. | |
| 5,203,834 A | 4/1993 | Hutchins et al. | |
| 5,213,446 A | 5/1993 | Dovan | |
| 5,216,050 A | 6/1993 | Sinclair | 524/108 |
| 5,247,059 A | 9/1993 | Gruber et al. | 528/354 |
| 5,249,628 A | 10/1993 | Surjaatmadja | |
| 5,251,697 A | 10/1993 | Shuler | |
| 5,295,542 A | 3/1994 | Cole et al. | |
| 5,304,620 A | 4/1994 | Holtmyer et al. | |
| 5,314,031 A | 5/1994 | Hale et al. | |
| 5,325,923 A | 7/1994 | Surjaatmadja et al. | |
| 5,330,005 A | 7/1994 | Card et al. | |
| 5,359,026 A | 10/1994 | Gruber | 528/354 |
| 5,360,068 A | 11/1994 | Sprunt et al. | |
| 5,363,916 A | 11/1994 | Himes et al. | |
| 5,373,901 A | 12/1994 | Norman et al. | |
| 5,386,874 A | 2/1995 | Laramay et al. | |
| 5,396,957 A | 3/1995 | Surjaatmadja et al. | |
| 5,402,846 A | 4/1995 | Jennings, Jr. et al. | |
| 5,439,055 A | 8/1995 | Card et al. | 166/280 |
| 5,460,226 A | 10/1995 | Lawson et al. | 166/300 |
| 5,464,060 A | 11/1995 | Hale et al. | |
| 5,475,080 A | 12/1995 | Gruber et al. | 528/354 |
| 5,484,881 A | 1/1996 | Gruber et al. | 528/354 |
| 5,487,897 A | 1/1996 | Polson et al. | |
| 5,492,177 A | 2/1996 | Yeh et al. | |
| 5,496,557 A | 3/1996 | Feijen et al. | |
| 5,497,830 A | 3/1996 | Boles et al. | |
| 5,499,678 A | 3/1996 | Surjaatmadja et al. | |
| 5,501,276 A | 3/1996 | Weaver et al. | |
| 5,505,787 A | 4/1996 | Yamaguchi | |
| 5,512,071 A | 4/1996 | Yam et al. | |
| 5,536,807 A | 7/1996 | Gruber et al. | 528/354 |
| 5,555,936 A | 9/1996 | Pirri et al. | |
| 5,591,700 A | 1/1997 | Harris et al. | 507/204 |
| 5,594,095 A | 1/1997 | Gruber et al. | 528/354 |
| 5,602,083 A | 2/1997 | Gabrysch et al. | |
| 5,604,186 A | 2/1997 | Hunt et al. | |
| 5,607,905 A | 3/1997 | Dobson, Jr. et al. | 507/211 |
| 5,613,558 A | 3/1997 | Dillenbeck | |
| 5,670,473 A | 9/1997 | Scepanski | |
| 5,697,440 A | 12/1997 | Weaver et al. | |
| 5,698,322 A | 12/1997 | Tsai et al. | |
| 5,723,416 A | 3/1998 | Liao | |
| 5,765,642 A | 6/1998 | Surjaatmadja | |
| 5,783,527 A | 7/1998 | Dobson, Jr. et al. | |
| 5,791,415 A | 8/1998 | Nguyen et al. | |
| 5,799,734 A | 9/1998 | Normal et al. | |
| 5,833,000 A | 11/1998 | Weaver et al. | |
| 5,849,401 A | 12/1998 | El-Afandi et al. | 428/215 |
| 5,853,048 A | 12/1998 | Weaver et al. | |
| 5,893,416 A | 4/1999 | Read | |
| 5,908,073 A | 6/1999 | Nguyen et al. | |
| 5,916,849 A | 6/1999 | House | |
| 5,924,488 A | 7/1999 | Nguyen et al. | |
| 5,964,291 A | 10/1999 | Bourne et al. | |
| 5,977,030 A | 11/1999 | House | |
| 5,979,557 A | 11/1999 | Card et al. | |
| 5,996,693 A | 12/1999 | Heathman | |
| 6,004,400 A | 12/1999 | Bishop et al. | |
| 6,024,170 A | 2/2000 | McCabe et al. | |
| 6,028,113 A | 2/2000 | Scepanski | |
| 6,047,772 A | 4/2000 | Weaver et al. | |
| 6,110,875 A | 8/2000 | Tjon-Joe-Pin et al. | |
| 6,114,410 A | 9/2000 | Betzold | 523/130 |
| 6,123,159 A | 9/2000 | Brookey et al. | |
| 6,123,965 A | 9/2000 | Jacob et al. | |
| 6,131,661 A | 10/2000 | Conner et al. | 166/300 |
| 6,135,987 A | 10/2000 | Tsai et al. | |
| 6,143,698 A | 11/2000 | Murphey et al. | 507/145 |
| 6,148,917 A | 11/2000 | Brookey et al. | |
| 6,162,766 A | 12/2000 | Muir et al. | 507/267 |
| 6,169,058 B1 | 1/2001 | Le et al. | |
| 6,172,011 B1 | 1/2001 | Card et al. | |
| 6,189,615 B1 | 2/2001 | Sydansk | 166/270 |
| 6,202,751 B1 | 3/2001 | Chatterji et al. | |
| 6,209,643 B1 | 4/2001 | Nguyen et al. | |
| 6,209,646 B1 | 4/2001 | Reddy et al. | |
| 6,214,773 B1 | 4/2001 | Harris et al. | |
| 6,242,390 B1 | 6/2001 | Mitchell et al. | 507/211 |
| 6,260,622 B1 | 7/2001 | Blok et al. | |
| 6,291,013 B1 | 9/2001 | Gibson et al. | |
| 6,300,286 B1 | 10/2001 | Dobson, Jr. et al. | |
| 6,302,209 B1 | 10/2001 | Thompson et al. | |
| 6,308,788 B1 | 10/2001 | Patel et al. | |
| 6,311,773 B1 | 11/2001 | Todd et al. | |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | |
| 6,330,917 B2 | 12/2001 | Chatterji et al. | |
| 6,357,527 B1 | 3/2002 | Norman et al. | |
| 6,364,945 B1 | 4/2002 | Chatterji et al. | |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | |
| 6,394,185 B1 | 5/2002 | Constien | 166/296 |
| 6,422,314 B1 | 7/2002 | Todd et al. | |
| 6,422,326 B1 | 7/2002 | Brookey et al. | |
| 6,432,155 B1 | 8/2002 | Swazey et al. | |
| 6,454,003 B1 | 9/2002 | Chang et al. | |
| 6,485,947 B1 | 11/2002 | Rajgarhia et al. | |
| 6,488,763 B2 | 12/2002 | Brothers et al. | |
| 6,494,263 B2 | 12/2002 | Todd | |
| 6,508,305 B1 | 1/2003 | Brannon et al. | |
| 6,509,301 B1 | 1/2003 | Vollmer et al. | |
| 6,527,051 B1 | 3/2003 | Reddy et al. | |
| 6,554,071 B1 | 4/2003 | Reddy et al. | |
| 6,566,310 B2 | 5/2003 | Chan | |
| 6,569,814 B1 | 5/2003 | Brady et al. | |
| 6,578,630 B2 | 6/2003 | Simpson et al. | |
| 6,599,863 B1 | 7/2003 | Palmer et al. | 507/219 |
| 6,667,279 B1 | 12/2003 | Hessert et al. | |
| 6,669,771 B2 | 12/2003 | Tokiwa et al. | 106/162 |
| 6,681,856 B1 | 1/2004 | Chatterji et al. | |
| 6,686,328 B1 | 2/2004 | Binder | |
| 6,691,780 B2 | 2/2004 | Nguyen et al. | |
| 6,702,023 B1 | 3/2004 | Harris et al. | 166/307 |
| 6,710,019 B1 | 3/2004 | Sawdon et al. | 507/136 |
| 6,716,797 B2 | 4/2004 | Brookey | |
| 6,737,385 B2 | 5/2004 | Todd et al. | |
| 6,761,218 B2 | 7/2004 | Nguyen et al. | 166/278 |
| 6,763,888 B1 | 7/2004 | Harris et al. | 166/305.1 |
| 6,764,981 B1 | 7/2004 | Eoff et al. | |
| 6,793,018 B2 | 9/2004 | Dawson et al. | |
| 6,793,730 B2 | 9/2004 | Reddy et al. | |
| 6,806,235 B1 | 10/2004 | Mueller et al. | |
| 6,817,414 B2 | 11/2004 | Lee | 166/278 |
| 6,818,594 B1 | 11/2004 | Freeman et al. | |
| 6,837,309 B2 | 1/2005 | Boney et al. | 166/280.2 |
| 6,883,608 B2 | 4/2005 | Parlar et al. | |
| 6,896,058 B2 | 5/2005 | Munoz, Jr. et al. | 166/279 |
| 6,904,971 B2 | 6/2005 | Brothers et al. | |
| 6,949,491 B2 | 9/2005 | Cooke, Jr. | 507/219 |
| 6,959,767 B2 | 11/2005 | Horton et al. | |
| 6,978,838 B2 * | 12/2005 | Parlar et al. | 166/311 |

| | | |
|---|---|---|
| 6,981,552 B2 | 1/2006 | Reddy et al. |
| 6,983,801 B2 | 1/2006 | Dawson et al. |
| 6,987,083 B2 | 1/2006 | Phillippi et al. |
| 6,997,259 B2 | 2/2006 | Nguyen |
| 7,007,752 B2 | 3/2006 | Reddy et al. |
| 7,021,337 B2 | 4/2006 | Markham |
| 7,032,663 B2 | 4/2006 | Nguyen |
| 7,036,586 B2 | 5/2006 | Roddy et al. |
| 7,036,587 B2 | 5/2006 | Munoz, Jr. et al. |
| 7,044,220 B2 | 5/2006 | Nguyen et al. |
| 7,044,224 B2 | 5/2006 | Nguyen |
| 7,063,151 B2 | 6/2006 | Nguyen et al. |
| 7,066,258 B2 | 6/2006 | Justus et al. |
| 7,069,994 B2 | 7/2006 | Cooke, Jr. |
| 7,080,688 B2 | 7/2006 | Todd et al. .................. 166/278 |
| 7,093,664 B2 | 8/2006 | Todd et al. |
| 7,096,947 B2 | 8/2006 | Todd et al. |
| 7,101,829 B2 | 9/2006 | Guichard et al. |
| 7,131,491 B2 | 11/2006 | Blauch et al. |
| 7,140,438 B2 | 11/2006 | Frost et al. |
| 7,147,067 B2 | 12/2006 | Getzlaf et al. |
| 7,151,077 B2 | 12/2006 | Prud'homme et al. |
| 7,156,174 B2 | 1/2007 | Roddy et al. |
| 7,165,617 B2 | 1/2007 | Lord et al. |
| 7,168,489 B2 | 1/2007 | Frost et al. |
| 7,172,022 B2 | 2/2007 | Reddy et al. |
| 7,178,596 B2 | 2/2007 | Blauch et al. ............... 166/280 |
| 7,195,068 B2 | 3/2007 | Todd |
| 7,204,312 B2 | 4/2007 | Roddy et al. |
| 7,219,731 B2 | 5/2007 | Sullivan et al. ............. 166/278 |
| 7,228,904 B2 | 6/2007 | Todd et al. |
| 7,261,156 B2 | 8/2007 | Nguyen et al. |
| 7,264,051 B2 | 9/2007 | Nguyen et al. |
| 7,267,170 B2 | 9/2007 | Mang et al. |
| 7,306,037 B2 | 12/2007 | Nguyen et al. |
| 2001/0016562 A1 | 8/2001 | Muir et al. .................. 507/201 |
| 2002/0036088 A1 | 3/2002 | Todd ......................... 166/300 |
| 2002/0119169 A1 | 8/2002 | Angel et al. |
| 2002/0125012 A1 | 9/2002 | Dawson et al. ............. 166/300 |
| 2003/0054962 A1 | 3/2003 | England et al. |
| 2003/0060374 A1 | 3/2003 | Cooke, Jr. ................... 507/200 |
| 2003/0114314 A1 | 6/2003 | Ballard et al. ............... 507/100 |
| 2003/0130133 A1 | 7/2003 | Vallmer ...................... 507/100 |
| 2003/0147965 A1 | 8/2003 | Bassett et al. |
| 2003/0188766 A1 | 10/2003 | Banerjee et al. |
| 2003/0230407 A1 | 12/2003 | Vijn et al. |
| 2003/0234103 A1 | 12/2003 | Lee et al. .................... 166/293 |
| 2004/0014606 A1 | 1/2004 | Parlar et al. |
| 2004/0014607 A1 | 1/2004 | Sinclair et al. .............. 507/200 |
| 2004/0040706 A1 | 3/2004 | Hossaini et al. ............. 166/278 |
| 2004/0055747 A1 | 3/2004 | Lee ............................. 166/278 |
| 2004/0070093 A1 | 4/2004 | Mathiowitz et al. |
| 2004/0094300 A1 | 5/2004 | Sullivan et al. .......... 166/308.1 |
| 2004/0099416 A1 | 5/2004 | Vijn et al. |
| 2004/0106525 A1 | 6/2004 | Willbert et al. |
| 2004/0138068 A1 | 7/2004 | Rimmer et al. |
| 2004/0152601 A1 | 8/2004 | Still et al. |
| 2004/0152602 A1 | 8/2004 | Boles |
| 2004/0162386 A1 | 8/2004 | Altes et al. |
| 2004/0170836 A1 | 9/2004 | Bond et al. |
| 2004/0214724 A1 | 10/2004 | Todd et al. |
| 2004/0216876 A1 | 11/2004 | Lee ......................... 166/280.1 |
| 2004/0231845 A1 | 11/2004 | Cooke, Jr. ................... 166/279 |
| 2004/0261993 A1 | 12/2004 | Nguyen ...................... 166/276 |
| 2004/0261995 A1 | 12/2004 | Nguyen ...................... 166/279 |
| 2004/0261996 A1 | 12/2004 | Munoz, Jr. et al. .......... 166/279 |
| 2004/0261999 A1 | 12/2004 | Nguyen ...................... 166/292 |
| 2005/0006095 A1 | 1/2005 | Justus et al. ................. 166/295 |
| 2005/0028976 A1 | 2/2005 | Nguyen ...................... 166/276 |
| 2005/0034861 A1 | 2/2005 | Saini et al. .................. 166/278 |
| 2005/0034865 A1 | 2/2005 | Todd et al. .................. 166/304 |
| 2005/0034868 A1 | 2/2005 | Frost et al. .................. 166/307 |
| 2005/0059556 A1 | 3/2005 | Munoz, Jr. et al. |

| | | |
|---|---|---|
| 2005/0059557 A1 | 3/2005 | Todd et al. |
| 2005/0059558 A1 | 3/2005 | Blauch et al. |
| 2005/0103496 A1 | 5/2005 | Todd et al. ................... 166/278 |
| 2005/0126785 A1 | 6/2005 | Todd .......................... 166/307 |
| 2005/0130848 A1 | 6/2005 | Todd et al. |
| 2005/0183741 A1 | 8/2005 | Surjaatmadja et al. |
| 2005/0205266 A1 | 9/2005 | Todd et al. |
| 2005/0252659 A1 | 11/2005 | Sullivan et al. ........... 166/280.1 |
| 2005/0272613 A1 | 12/2005 | Cooke, Jr. ................... 507/219 |
| 2005/0277554 A1 | 12/2005 | Blauch et al. |
| 2006/0016596 A1 | 1/2006 | Pauls et al. |
| 2006/0032633 A1 | 2/2006 | Nguyen |
| 2006/0046938 A1 | 3/2006 | Harris et al. |
| 2006/0048938 A1 | 3/2006 | Kalman |
| 2006/0065397 A1 | 3/2006 | Nguyen et al. |
| 2006/0105917 A1 | 5/2006 | Munoz, Jr. ................... 507/103 |
| 2006/0105918 A1 | 5/2006 | Munoz, Jr. et al. |
| 2006/0169182 A1 | 8/2006 | Todd et al. |
| 2006/0169450 A1 | 8/2006 | Mang et al. |
| 2006/0172891 A1 | 8/2006 | Todd et al. |
| 2006/0172893 A1 | 8/2006 | Todd et al. |
| 2006/0172894 A1 | 8/2006 | Mang et al. |
| 2006/0172895 A1 | 8/2006 | Mang et al. |
| 2006/0185847 A1 | 8/2006 | Saini et al. |
| 2006/0185848 A1 | 8/2006 | Surjaatmadja et al. |
| 2006/0258543 A1 | 11/2006 | Saini |
| 2006/0258544 A1 | 11/2006 | Saini |
| 2006/0276345 A1 | 12/2006 | Todd et al. |
| 2006/0283597 A1 | 12/2006 | Schriener et al. ............. 166/300 |
| 2007/0235190 A1 | 10/2007 | Lord et al. |

FOREIGN PATENT DOCUMENTS

| | | |
|---|---|---|
| EP | 0 879 935 A2 | 11/1998 |
| EP | 0 879 935 A3 | 10/1999 |
| EP | 1 413 710 A1 | 4/2004 |
| EP | 1413710 A1 | 4/2004 |
| JP | 2004181820 A | 7/2004 |
| WO | WO 93/15127 | 8/1993 |
| WO | WO 93/15127 A1 | 8/1993 |
| WO | WO 94/07949 | 4/1994 |
| WO | WO 94/07949 A1 | 4/1994 |
| WO | WO 94/08078 | 4/1994 |
| WO | WO 94/08078 A1 | 4/1994 |
| WO | WO 94/08090 | 4/1994 |
| WO | WO 94/08090 A1 | 4/1994 |
| WO | WO 95/09879 | 4/1995 |
| WO | WO 95/09879 A1 | 4/1995 |
| WO | WO 97/11845 | 4/1997 |
| WO | WO 97/11845 A1 | 4/1997 |
| WO | WO 99/27229 | 6/1999 |
| WO | WO 00/57022 | 9/2000 |
| WO | WO 01/02698 | 1/2001 |
| WO | WO 01/94744 | 12/2001 |
| WO | WO 02/55843 A1 | 1/2002 |
| WO | WO 02/12874 A1 | 2/2002 |
| WO | WO 2004/007905 | 1/2004 |
| WO | WO 2004/037946 A1 | 5/2004 |
| WO | WO 2004/038176 A1 | 5/2004 |

OTHER PUBLICATIONS

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemical "Trigger" Useful for Oilfield Applications*, Society of Petroleum Engineers, Inc., SPE 92709, Feb. 4, 2005.

Skrabal et al., *The Hydrolysis Rate of Orthoformic Acid Ethyl Ether*, Chemical Institute of the University of Graz, pp. 1-38, Jan. 13, 1921.

Heller, et al., *Poly(ortho esters)—From Concept To Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release* 71, 2001, (pp. 31-37).

Heller, et al., *Poly(ortho ester)—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjuctival biocompatibility of a viscous bioerodible poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Y. Chiang et al.: "Hydrolysis of Ortho Esters: Further Investigation of the Factors Which Control the Rate-determining Step," Engineering Information Inc., NY, NY, vol. 105, No. 23 (XP-002322842), Nov. 16, 1983.

M. Ahmad, et al.: Ortho Ester Hydrolysis: Direct Evidence for a Three-Stage Reaction Mechanism, Engineering Information Inc., NY, NY, vol. 101, No. 10 (XP-002322843), May 9, 1979.

U.S. Appl. No. 10/650,101, filed Aug. 26, 2003, Todd, et al.
U.S. Appl. No. 10/655,883, filed Sep. 5, 2003, Nguyen.
U.S. Appl. No. 10/661,173, filed Sep. 11, 2003, Todd, et al.
U.S. Appl. No. 10/664,126, filed Sep. 17, 2003, Todd, et al.
U.S. Appl. No. 10/736,152, filed Dec. 15, 2003, Todd.
U.S. Appl. No. 10/765,334, filed Jan. 27, 2004, Todd, et al.
U.S. Appl. No. 10/768,323, filed Jan. 30, 2004, Roddy, et al.
U.S. Appl. No. 10/768,864, filed Jan. 30, 2004, Roddy, et al.
U.S. Appl. No. 10/769,490, filed Jan. 30, 2004, Roddy, et al.
U.S. Appl. No. 10/783,207, filed Feb. 20, 2004, Surjaatmadja, et al.
U.S. Appl. No. 10/785,300, filed Feb. 24, 2004, Frost, et al.
U.S. Appl. No. 10/802,340, filed Mar. 17, 2004, Reddy, et al.
U.S. Appl. No. 10/803,668, filed Mar. 17, 2004, Todd, et al.
U.S. Appl. No. 10/803,689, filed Mar. 18, 2004, Todd, et al.

Advances in Polymer Science, vol. 157, "Degradable Aliphatic Polyesters," (A.C. Albertsson ed.), pp. 1-138.

Simmons, et al., "Poly(phenyllactide): Synthesis, Characterization, and Hydrolytic Degradation," Biomacromolecules, vol. 2, No. 3, 2001 (pp. 658-663).

Yin, et al., "Preparation and Characterization of Substituted Polylactides," Am. Chem. Soc., vol. 32, No. 23, 1999 (pp. 7711-7718).

Yin, et al., "Synthesis and Properties of Polymers Derived form Substituted Lactic Acids," Am. Chem. Soc., Ch. 12, 2001 (pp. 147-159).

U.S. Appl. No. 11/047,876, filed Jan. 31, 2005, Mang, et al.
U.S. Appl. No. 11/049,600, filed Feb. 2, 2005, Mang, et al.

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, Degradable Aliphatic Polyesters, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, *A New Assay for the Enzymatic Degradation of Polylactic Acid, Short Report*, ScienceAsia, vol. 29, 2003 (pp. 297-300).

Halliburton, *SurgiFrac$^{SM}$ Service, A Quick and Cost-Effective Method to Help Boost Production From Openhole Horizontal Completions, Halliburton Communications*, HO3297, 2002.

Halliburton, *Cobra Frac$^{SM}$ Service, Coiled Tubing Fracturing—Cost Effective Method for Stimulating Untapped Reserves*, HO2319R, Halliburton Energy Services, 2000.

Halliburton, *CobraJet Frac$^{SM}$ Service, Cost-effective Technology That Can Help Reduce Cost Per BOE Produced, Shorten Cycle Time and Reduce Capex*, Halliburton Communications.

Kiyoshi Matsuyama et al, Environmentally benign formation of polymericmicrospheres by rapid expansion of supercritical carbon dioxide solution with a nonsolvent, Environ Sci Technol2001, 35, 4149-4155.

* cited by examiner

TREATMENT FLUIDS AND METHODS OF USE IN SUBTERRANEAN FORMATIONS

BACKGROUND OF THE INVENTION

The present invention relates to subterranean treatment operations. More particularly, the present invention relates to improved treatment fluids and methods of using such improved treatment fluids in subterranean formations.

The process of drilling a well bore in a subterranean formation typically requires the use of a treatment fluid referred to as a "drilling fluid." During the drilling process, the drilling fluid passes down through the inside of a drill string, exits through a drill bit, and returns to a drill rig through an annulus between the drill string and the walls of the well bore. The circulating drilling fluid, inter alia, lubricates the drill bit, carries drill cuttings to the surface, and balances the formation pressure exerted on the well bore.

To prevent undesirable leak-off of the drilling fluid into the formation, drilling fluids often may be formulated to form a fast and efficient filter cake on the walls of the well bore. The filter cake often comprises an inorganic portion (e.g., calcium carbonate), and an organic portion (e.g., starch and xanthan). The filter cake generally is removed before the production of hydrocarbons from the formation. Conventional methods of removal have involved contacting the filter cake with one or more subsequent cleanup fluids (e.g., an acid) that are formulated to degrade either the inorganic portion or the organic portion of the filter cake. These methods have been problematic, however, because conventional cleanup fluids tend to degrade the filter cake unevenly, which may result in premature leak-off of the cleanup fluid into the formation through "pinholes" in the filter cake, before the entirety of the filter cake has been degraded. This is undesirable, because it may leave the majority of the filter cake intact within the well bore, thereby delaying the onset of hydrocarbon production from the formation, and necessitating repeated cleanup efforts until the filter cake eventually may be removed to a desired degree.

SUMMARY OF THE INVENTION

The present invention relates to subterranean treatment operations. More particularly, the present invention relates to improved treatment fluids and methods of using such improved treatment fluids in subterranean formations.

An example of a method of the present invention is a method of treating a subterranean formation, comprising: providing a well bore in a subterranean formation that includes a filter cake on at least a portion of the well bore; contacting the filter cake with a treatment fluid comprising a degradable diverting agent; permitting the degradable diverting agent to retain the treatment fluid within the well bore for a time sufficient to degrade the filter cake to a desired degree; and permitting the degradable diverting agent to degrade.

Another example of a method of the present invention is a method of degrading a filter cake in a subterranean formation comprising the step of contacting the filter cake with a treatment fluid comprising a degradable diverting agent.

Another example of a method of the present invention is a method of drilling in a subterranean formation, comprising: using a drilling fluid to drill a well bore in a subterranean formation; permitting the drilling fluid to establish a filter cake in at least a portion of the well bore; contacting the filter cake with a treatment fluid comprising a degradable diverting agent; permitting the filter cake to degrade; and permitting the degradable diverting agent to degrade.

An example of a composition of the present invention is a treatment fluid comprising a degradable diverting agent.

Another example of a composition of the present invention is a degradable diverting agent.

The features and advantages of the present invention will be readily apparent to those skilled in the art upon a reading of the description of the embodiments that follows.

DETAILED DESCRIPTION OF EMBODIMENTS

The present invention relates to subterranean treatment operations. More particularly, the present invention relates to improved treatment fluids and methods of using such improved treatment fluids in subterranean formations.

The treatment fluids of the present invention generally comprise a degradable diverting agent and a base fluid. Optionally, other additives may be included in the treatment fluids of the present invention.

The degradable diverting agents used in the treatment fluids of the present invention generally comprise a degradable material that is capable of undergoing an irreversible degradation downhole. The term "irreversible," as used herein, means that the degradable diverting agent, once degraded, should not recrystallize or reconsolidate while downhole, e.g., the degradable diverting agent should degrade in situ, but should not recrystallize or reconsolidate in situ. The terms "degradation" and "degradable" refer to both the two relatively extreme cases of hydrolytic degradation that the degradable diverting agent may undergo (e.g., bulk erosion and surface erosion), and any stage of degradation in between these two. This degradation can be a result of, inter alia, a chemical or thermal reaction, or a reaction induced by radiation.

In certain embodiments, the degradable diverting agent may be in particulate form. In certain embodiments, the degradable diverting agent may have a particle size distribution in the range of from about 0.1 micron to about 1.0 millimeter. Certain embodiments of the treatment fluids of the present invention may comprise degradable diverting agents having a broader particle size distribution or a narrower particle size distribution.

The degradable diverting agent may be present in the treatment fluids of the present invention in an amount sufficient to provide a desired amount of fluid loss control. In certain embodiments, the degradable diverting agent may be present in the treatment fluids of the present invention in an amount in the range of from about 0.01% to about 10% by weight. In certain embodiments, the degradable diverting agent may be present in the treatment fluids of the present invention in an amount in the range of from about 0.1% to about 5% by weight. In certain embodiments, the degradable diverting agent may provide the treatment fluids of the present invention with the desired amount of fluid loss control by, inter alia, bridging or obstructing pore throats in the subterranean formation. This may, inter alia, permit a greater amount of the treatment fluids of the present invention to remain in the well bore for a greater amount of time (rather than flowing into the subterranean formation), which may promote more even cleanup of the filter cake that has been deposited on the walls of the well bore.

Generally, the degradable diverting agents in the treatment fluids of the present invention may degrade over time, to facilitate hydrocarbon production from the formation after the conclusion of the treatment operation. In certain embodiments, the degradable diverting agents may degrade slowly over time, as opposed to instantaneously. Slow degradation of the degradable diverting agent may, inter alia, help to maintain the stability of the filter cake. The time required for degradation of the degradable diverting agents may depend on factors including, but not limited to, the temperature to which the degradable diverting agents are exposed, as well as the type of degradable diverting agent used. In certain embodiments, the treatment fluids of the present invention may comprise a degradable diverting agent that does not begin to degrade until a time in the range of from at least about 12 to about 96 hours after its placement in the subterranean formation. In certain embodiments, the treatment fluids of the present invention may comprise a degradable diverting agent that does not begin to degrade until a time in the range of from at least about 12 to about 24 hours after its placement in the subterranean formation. Certain embodiments of the treatment fluids of the present invention may comprise degradable diverting agents that may begin degrading in less than about 12 hours after placement in a subterranean formation or that may not begin degrading until greater than about 96 hours after placement in a subterranean formation.

The degradable diverting agents of the present invention may be made from a variety of degradable materials. Non-limiting examples of suitable degradable materials that may be used in conjunction with the present invention include, but are not limited to, degradable polymers, dehydrated organic or inorganic compounds, and/or mixtures thereof. In choosing the appropriate degradable material, one should consider the degradation products that will result. Also, these degradation products should not adversely affect other operations or components. For example, a boric acid derivative may not be included as a degradable material in the treatment fluids of the present invention that utilize xanthan as the viscosifier, because boric acid and xanthan are generally incompatible. One of ordinary skill in the art, with the benefit of this disclosure, will be able to recognize when potential components of the treatment fluids of the present invention would be incompatible or would produce degradation products that would adversely affect other operations or components.

As for degradable polymers, a polymer is considered to be "degradable" herein if the degradation is due to, inter alia, processes such as hydrolysis, oxidation, enzymatic degradation, or UV radiation. The degradability of a polymer generally depends, at least in part, on its backbone structure. For instance, the presence of hydrolyzable and/or oxidizable linkages in the backbone often yields a material that will degrade as described herein. The rates at which such polymers degrade may depend on, inter alia, the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how the polymer degrades, e.g., temperature, presence of moisture, oxygen, microorganisms, enzymes, pH, and the like.

Suitable examples of degradable polymers that may be used in accordance with the present invention include, but are not limited to, those described in the publication of Advances in Polymer Science, Vol. 157, entitled "Degradable Aliphatic Polyesters," edited by A. C. Albertsson, pages 1-138. Specific examples include, but are not limited to, homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process. Specific examples of suitable polymers include, but are not limited to, polysaccharides such as dextran or cellulose; chitin; chitosan; proteins; orthoesters; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxide); and polyphosphazenes. Of these suitable polymers, aliphatic polyesters and polyanhydrides may be preferred for some applications.

Aliphatic polyesters degrade chemically, inter alia, by hydrolytic cleavage. Hydrolysis can be catalyzed by either acids or bases. Generally, during the hydrolysis, carboxylic end groups are formed during chain scission, which may enhance the rate of further hydrolysis. This mechanism is known in the art as "autocatalysis," and is thought to make polymer matrices more bulk-eroding.

Suitable aliphatic polyesters have the general formula of repeating units shown below:

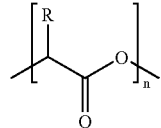

formula I where n is an integer between 75 and 10,000 and R is selected from the group consisting of hydrogen, alkyl, aryl, alkylaryl, acetyl, heteroatoms, and mixtures thereof. In certain embodiments, the aliphatic polyester may be poly(lactide). Poly(lactide) may be synthesized either from lactic acid by a condensation reaction or, more commonly, by ring-opening polymerization of cyclic lactide monomer. Since both lactic acid and lactide can achieve the same repeating unit, the general term poly(lactic acid) as used herein refers to writ of formula I without any limitation as to how the polymer was made (such as from lactides, lactic acid, or oligomers), and without reference to the degree of polymerization or level of plasticization.

The lactide monomer exists generally in three different forms: two stereoisomers (L- and D-lactide) and racemic D,L-lactide (meso-lactide). The oligomers of lactic acid, and oligomers of lactide are defined by the formula:

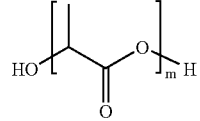

formula II where m is an integer: $2 \leq m \leq 75$. In certain embodiments, m may be an integer: $2 \leq m \leq 10$. These limits correspond to number-average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This may be desirable, inter alia, in applications of the present invention where a slower degradation of the degradable material may be desired. Poly(D,L-lactide) may be a more amorphous polymer with a resultant faster hydrolysis rate, which may be suitable, inter alia, for other applications where a more rapid degradation may be appropriate. The stereoisomers of lactic acid may be used individually, or may be combined in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified by blending high- and low-molecular-weight polylactide, or by blending polylactide with other polyesters.

Aliphatic polyesters useful in the present invention may be prepared by substantially any of the conventionally known manufacturing methods, including, but not limited to, those described in U.S. Pat. Nos. 6,323,307; 5,216,050; 4,387,769; 3,912,692; and 2,703,316, the relevant disclosures of which are incorporated herein by reference. In addition to the other qualities above, the plasticizers may enhance the degradation rate of the degradable polymeric materials.

Polyanhydrides are another type of particularly suitable degradable polymer that may be useful in the degradable diverting agents of the present invention. Polyanhydride hydrolysis proceeds, inter alia, via free carboxylic acid chain-ends to yield carboxylic acids as final degradation products. The erosion time can be varied over a broad range of changes in the polymer backbone. Examples of suitable polyanhydrides include, but are not limited to, poly(adipic anhydride), poly(suberic anhydride), poly(sebacic anhydride), and poly (dodecanedioic anhydride). Other suitable examples include, but are not limited to, poly(maleic anhydride) and poly(benzoic anhydride).

The physical properties of degradable polymers may depend on several factors, including, inter alia, the composition of the repeat units, flexibility of the chain, presence of polar groups, molecular mass, degree of branching, crystallinity, and orientation. For example, short-chain branches may reduce the degree of crystallinity of polymers, while long-chain branches may lower the melt viscosity and impart, inter alia, elongational viscosity with tension-stiffening behavior. The properties of the degradable material utilized further can be tailored by blending, and copolymerizing it with another polymer, or by changing the macromolecular architecture (e.g., hyper-branched polymers, star-shaped, or dendrimers). The properties of any such suitable degradable polymers (e.g., hydrophobicity, hydrophilicity, rate of degradation) can be tailored, inter alia, by introducing select functional groups along the polymer chains. For example, poly (phenyllactide) will degrade at about ⅕th of the rate of racemic poly(lactide) at a pH of 7.4 at 55° C. One of ordinary skill in the art, with the benefit of this disclosure, will be able to determine the appropriate functional groups to introduce to the polymer chains to achieve the desired physical properties of the degradable polymers.

The choice of degradable material for use in the degradable diverting agents of the present invention may depend, at least in part, on the conditions of the well, e.g., well bore temperature. For instance, lactides have been found to be suitable for lower temperature wells, including those within the range of about 60° F. to about 150° F., and polylactides have been found to be suitable for well bore temperatures above this range. Dehydrated organic or inorganic compounds also may be suitable for higher temperature wells.

The specific features of the degradable diverting agents of the present invention may be modified so as to prevent loss of fluid to the formation when the filter cake is intact, while facilitating the removal of the filter cake when such removal becomes desirable. Whichever degradable material is utilized in the degradable diverting agents of the present invention, the degradable diverting agents may have any shape, including, but not limited to, particles having the physical shape of platelets, shavings, flakes, ribbons, rods, strips, spheroids, toroids, pellets, tablets, or any other physical shape. One of ordinary skill in the art, with the benefit of this disclosure, will recognize a desirable degradable material that may be used in the degradable diverting agents of the present invention and the preferred size and shape for a given application.

In certain embodiments, the degradable diverting agents of the present invention further comprise a degrading agent that facilitates the degradation of the degradable diverting agent. In certain embodiments, the degrading agent comprises water. For example, the degradable diverting agents of the present invention may comprise a water-containing compound. Any compound containing releasable water may be used as the water-containing compound. As referred to herein, the term "releasable water" will be understood to mean water that may be released under desired downhole conditions, including, inter alia, temperature. In certain embodiments, the water-containing compound may be sodium acetate trihydrate, sodium borate decahydrate, sodium carbonate decahydrate, or the like. In certain preferred embodiments, the water-containing compound is sodium acetate trihydrate.

The treatment fluids of the present invention generally comprise a base fluid. Generally, the base fluid may be present in an amount sufficient to form a pumpable treatment fluid. More particularly, the base fluid typically is present in the treatment fluid in an amount in the range of from about 20% to about 99.99% by weight. In certain embodiments, the base fluid may be an aqueous base fluid that comprises, e.g., fresh water, salt water (e.g., water containing one or more salts dissolved therein), brine (e.g., saturated salt water), or seawater. In certain embodiments, the base fluid may comprise a solvent. A wide variety of solvents may be used as the base fluid in the treatment fluids of the present invention. For example, the solvent may comprise an acid solution, including, but not limited to, solutions of acids such as acetic acid, hydrochloric acid, and formic acid, and other mineral or organic acids (e.g., citric acid, lactic acid, sulfamic acid), and the like. Where an acid solution is used as the base fluid in the treatment fluids of the present invention, the acid solution generally will be present in the treatment fluid in an amount sufficient to degrade any calcium carbonate and/or polymers within the filter cake to a desired degree. In certain embodiments, the acid solution may be present in the treatment fluid in an amount in the range of from about 70% to about 99.99% by weight. Generally, the acid solution may have a strength in the range of from about 0.01% to about 40% by weight of the acid in the acid solution, with the balance comprising water. In certain embodiments, the acid solution may have a strength in the range of from about 5% to about 10% by weight of the acid in the acid solution, with the balance comprising water. In certain embodiments, the base fluid may comprise a solvent that may comprise a solution of a polycarboxylic acid chelating agent in water, an example of which is commercially available from Halliburton Energy Services, Inc., of Duncan, Okla., under the trade name "BaSO$_4$lvent." Where included, the polycarboxylic acid chelating agent may be present in the base fluid in an amount in the range of from about 1% to about 100% by volume. In certain embodiments, the polycarboxylic acid chelating agent may be present in the base fluid in an amount in the range of from about 5% to about 25% by volume.

Optionally, the treatment fluids of the present invention may comprise other additives, including, but not limited to, surfactants, chelating agents, corrosion inhibitors, viscosifiers, enzyme breakers, iron reducers, and antisludging agents, and the like. An example of a chelating agent that may be suitable is ethylene diamine tetraacetic acid (EDTA). An example of a viscosifier that may be suitable is hydroxyethylcellulose. Commercially available examples of corrosion inhibitors that may be suitable include, but are not limited to, those that are available from Halliburton Energy Services, Inc., of Duncan, Okla., under the trade names MSA-II, HAI-85M, HAI-OS, and HAI-GE. Commercially available examples of surfactants that may be suitable include, but are not limited to, those that are available from Halliburton Energy Services, Inc., of Duncan, Okla., under the trade names LO-SURF 300, NEA-96M, MORFLO-III, and HYFLO-IV.

In one embodiment of the present invention, a treatment fluid of the present invention, comprising a degradable diverting agent of the present invention, may be used in a filter-cake-cleanup operation in an injector well in which no gravel pack is present. The treatment fluid of the present invention may be "spotted" (e.g., selectively located) over the filter cake interval and permitted to soak into the filter cake for a period of time. Any "pinholes" that may be created in the filter cake by the treatment fluid will be obstructed at the time of their formation by the degradable diverting agents, thereby permitting the treatment fluid to remain in the well bore for a greater period of time and evenly clean the entire filter cake interval.

An example of a method of the present invention is a method of treating a subterranean formation, comprising: providing a well bore in a subterranean formation that includes a filter cake on at least a portion of the well bore; contacting the filter cake with a treatment fluid comprising a degradable diverting agent; permitting the degradable diverting agent to retain the treatment fluid within the well bore for a time sufficient to degrade the filter cake to a desired degree; and permitting the degradable diverting agent to degrade.

Another example of a method of the present invention is a method of degrading a filter cake in a subterranean formation comprising the step of contacting the filter cake with a treatment fluid comprising a degradable diverting agent.

Another example of a method of the present invention is a method of drilling in a subterranean formation, comprising: using a drilling fluid to drill a well bore in a subterranean formation; permitting the drilling fluid to establish a filter cake in at least a portion of the well bore; contacting the filter cake with a treatment fluid comprising a degradable diverting agent; permitting the filter cake to degrade; and permitting the degradable diverting agent to degrade.

An example of a composition of the present invention is a treatment fluid comprising a degradable diverting agent.

Another example of a composition of the present invention is a degradable diverting agent for use in a subterranean treatment fluid.

Therefore, the present invention is well adapted to carry out the objects and attain the ends and advantages mentioned as well as those that are inherent therein. While the invention has been depicted and described with reference to embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are only, and are not exhaustive of the scope of the invention. Consequently, the invention is intended to be limited only by the spirit and scope of the appended claims, giving full cognizance to equivalents in all respects.

What is claimed is:

1. A method of treating a subterranean formation, comprising:
   providing a well bore in a subterranean formation that includes a filter cake on at least a portion of the well bore;
   contacting the filter cake with a treatment fluid comprising
      a base fluid that comprises water, and
      a degradable diverting agent that comprises at least one degradable material selected from the group consisting of an orthoester, a poly(orthoester), and a mixture thereof;
   permitting the degradable diverting agent to retain the treatment fluid in a portion of the well bore for a time sufficient to degrade the filter cake located in that portion of the well bore; and
   permitting the degradable diverting agent to degrade.

2. The method of claim 1 wherein the filter cake comprises calcium carbonate.

3. The method of claim 1 wherein the step of permitting the degradable diverting agent to degrade occurs after the step of permitting the degradable diverting agent to retain the treatment fluid within the well bore for a time sufficient to degrade the filter cake to a desired degree.

4. The method of claim 1 wherein the degradable diverting agent is in particulate form.

5. The method of claim 1 wherein the degradable diverting agent further comprises at least one stereoisomer of a poly(lactide).

6. The method of claim 1 wherein the degradable diverting agent further comprises poly(lactic acid).

7. The method of claim 1 wherein the base fluid is present in the treatment fluid in an amount in the range of from about 20% to about 99.99% by weight.

8. The method of claim 1 wherein the base fluid further comprises a solvent.

9. The method of claim 8 wherein the solvent comprises an acid solution.

10. The method of claim 9 wherein the acid solution comprises at least one acid solution selected from the group consisting of solutions of: acetic acid; hydrochloric acid; formic acid; a mineral acid; and an organic acid.

11. The method of claim 9 wherein the acid solution is present in the treatment fluid in an amount in the range of from about 70% to about 99.9% by weight.

12. The method of claim 8 wherein the solvent is a solution of a polycarboxylic acid chelating agent in water.

13. The method of claim 1 wherein the treatment fluid further comprises at least one additive selected from the group consisting of: a surfactant, a chelating agent, a corrosion inhibitor, a viscosifier, an enzyme breaker, an iron reducer, and an antisludging agent.

14. The method of claim 13 wherein the chelating agent is ethylene diamine tetraacetic acid.

15. The method of claim 13 wherein the viscosifier is hydroxyethylcellulose.

16. A method of degrading a filter cake in a well bore in a subterranean formation comprising:
   contacting the filter cake with a treatment fluid comprising
      a solvent that comprises water, and
      a degradable diverting agent that comprises at least one degradable material selected from the group consisting of an orthoester, a poly(orthoester), and a mixture thereof; and permitting the degradable diverting agent to retain the treatment fluid in a portion of the well bore for a time sufficient to degrade the filter cake located in that portion of the well bore.

17. The method of claim 16 further comprising permitting the degradable diverting agent to degrade.

18. The method of claim 16 wherein the degradable diverting agent is in particulate form.

19. The method of claim 16 wherein the degradable diverting agent further comprises at least one stereoisomer of a poly(lactide).

20. The method of claim 16 wherein the degradable diverting agent further comprises poly(lactic acid).

21. The method of claim 16 wherein the treatment fluid further comprises a base fluid.

22. The method of claim 21 wherein the base fluid is present in the treatment fluid in an amount in the range of from about 20% to about 99.99% by weight.

23. The method of claim 16 wherein the solvent further comprises an acid solution.

24. The method of claim 23 wherein the acid solution comprises at least one acid solution selected from the group consisting of solutions of: acetic acid; hydrochloric acid; formic acid; a mineral acid; and an organic acid.

25. The method of claim 23 wherein the acid solution is present in the treatment fluid in an amount in the range of from about 70% to about 99.99% by weight.

26. The method of claim 16 wherein the solvent comprises a solution of a polycarboxylic acid chelating agent in water.

27. The method of claim 16 wherein the treatment fluid further comprises at least one additive selected from the group consisting of: a surfactant, a chelating agent, a corrosion inhibitor, a viscosifier, an enzyme breaker, an iron reducer, and an antisludging agent.

28. The method of claim 27 wherein the chelating agent is ethylene diamine tetraacetic acid.

29. The method of claim 27 wherein the viscosifier is hydroxyethylcellulose.

30. A method of drilling in a subterranean formation, comprising:
   using a drilling fluid to drill a well bore in a subterranean formation;
   permitting the drilling fluid to establish a filter cake in at least a portion of the well bore;
   contacting the filter cake with a treatment fluid comprising water, and
      a degradable diverting agent that comprises at least one degradable material selected from the group consisting of an orthoester, a poly(orthoester), and a mixture thereof;
   permitting the degradable diverting agent to retain the treatment fluid in a portion of the well bore for a time sufficient to degrade the filter cake located in that portion of the well bore;
   permitting the filter cake to degrade; and
   permitting the degradable diverting agent to degrade.

31. The method of claim 30 wherein the step of permitting the degradable diverting agent to degrade occurs after the step of permitting the degradable diverting agent to retain the treatment fluid within the at least a portion of the well bore for a time sufficient to degrade the filter cake to a desired degree.

32. The method of claim 30 wherein the filter cake comprises calcium carbonate.

33. The method of claim 30 wherein the degradable diverting agent further comprises at least one stereoisomer of a poly(lactide).

34. The method of claim 30 wherein the degradable diverting agent further comprises poly(lactic acid).

* * * * *